United States Patent
Ikeda et al.

(10) Patent No.: US 7,699,961 B2
(45) Date of Patent: Apr. 20, 2010

(54) APPARATUS FOR CONCENTRATING WATER-SOLUBLE ORGANIC MATERIAL

(75) Inventors: Shiro Ikeda, Kanagawa-ken (JP); Takashi Nakane, Ibaraki-ken (JP)

(73) Assignee: Mitsubishi Chemical Corporation, Tokyo (JP)

( * ) Notice: Subject to any disclaimer, the term of this patent is extended or adjusted under 35 U.S.C. 154(b) by 914 days.

(21) Appl. No.: 10/492,792

(22) PCT Filed: Oct. 19, 2001

(86) PCT No.: PCT/JP01/09186

§ 371 (c)(1), (2), (4) Date: Apr. 16, 2004

(87) PCT Pub. No.: WO03/035222

PCT Pub. Date: May 1, 2003

(65) Prior Publication Data

US 2004/0256212 A1  Dec. 23, 2004

(51) Int. Cl.
*B01D 3/14* (2006.01)
*B01D 53/22* (2006.01)
*B01D 61/36* (2006.01)

(52) U.S. Cl. .............. 202/154; 159/DIG. 27; 159/DIG. 28; 202/155; 202/161; 202/172; 202/182; 202/202; 203/25; 203/78; 203/84; 203/DIG. 8; 210/500.21; 210/640; 210/653; 210/664

(58) Field of Classification Search ......... 202/154–155, 202/161, 172–173, 182, 202; 203/25, 27, 203/78, 84, 87, 98, DIG. 8, DIG. 25; 210/263, 210/500.21, 634, 653, 640, 660, 664; 159/DIG. 27, 159/DIG. 28
See application file for complete search history.

(56) References Cited

U.S. PATENT DOCUMENTS

| | | | | |
|---|---|---|---|---|
| 4,345,976 A | * | 8/1982 | Peter et al. | 203/49 |
| 4,405,409 A | * | 9/1983 | Tusel et al. | 202/200 |
| 4,472,246 A | * | 9/1984 | Stamerjohn et al. | 203/37 |

(Continued)

FOREIGN PATENT DOCUMENTS

JP  57-091702 A  6/1982

(Continued)

OTHER PUBLICATIONS

Perry et al "Distillation"vol. IV Aug. 25, 1965.*

(Continued)

*Primary Examiner*—Virginia Manoharan
(74) *Attorney, Agent, or Firm*—Sughrue Mion, PLLC

(57) ABSTRACT

A water-soluble organic material condensation apparatus equipped with a distillation column for distilling an aqueous solution of a water-soluble organic material, wherein a vapor generated at the top of the distillation column or a condensed liquid from the vapor is introduced to a device other than the distillation column which has the function to separate water from the water-soluble organic material to thereby condense the water-soluble organic material through separating water and then the condensed water-soluble organic material is recycled to the distillation column. The device other than the distillation column is desirably a separating film such as a zeolite film. The apparatus is improved in the operation of the upper portion of the condensation section of the distillation column and allows energy savings during distillation.

2 Claims, 9 Drawing Sheets

U.S. PATENT DOCUMENTS

| | | | |
|---|---|---|---|
| 4,895,989 A * | 1/1990 | Sander et al. ............... 568/851 |
| 4,900,402 A * | 2/1990 | Kaschemekat et al. ........ 203/19 |
| 5,105,029 A | 4/1992 | Ninomiya et al. |
| 5,427,687 A * | 6/1995 | Blum et al. .................. 210/638 |
| 5,976,324 A | 11/1999 | Groeschl et al. |
| 6,159,542 A | 12/2000 | Kondo et al. |
| 6,200,429 B1 * | 3/2001 | Freyhof et al. ............... 203/71 |
| 6,632,330 B1 * | 10/2003 | Colley et al. .................. 203/29 |
| 6,755,975 B2 * | 6/2004 | Vane et al. .................. 210/640 |
| 7,291,250 B1 * | 11/2007 | Popp et al. .................... 203/19 |

FOREIGN PATENT DOCUMENTS

| | | |
|---|---|---|
| JP | 58-021629 A | 2/1983 |
| JP | 61-158774 A | 7/1986 |
| JP | 63-254987 A | 10/1988 |
| JP | 63-278522 A | 11/1988 |
| JP | 03-005431 A | 1/1991 |
| JP | 05-305201 | 11/1993 |
| JP | 6-226002 A | 8/1994 |
| JP | 6-287153 A | 10/1994 |

OTHER PUBLICATIONS

Pettersen T. et al.; "Design of hybrid distillation and vapor permeation processes" Journal of Membrane Science, Elsevier Scientific Publ. Co., Amsterdam, NL, vol. 102, Jun. 15, 1995; pp. 21-30, XPO04041364.

English Translation of First Office Action dated Jan. 9, 2009.
Translation of Second Office Action dated Sep. 9, 2008.
English Translation of Third Office Action dated Nov. 11, 2008.
Abridged English translation of JP 63-278522 A.
English Translation of claims of corresponding Japanese Patent Application No. 2003-537781.

* cited by examiner

Vapor-Liquid Equilibrium of Water and 2-propenol (IPA)

APPARATUS FOR CONCENTRATING WATER-SOLUBLE ORGANIC MATERIAL

BACKGROUND OF THE INVENTION

1. Field of the Invention

The present invention relates to an apparatus for concentrating a water-soluble organic material, particularly, to an apparatus for concentrating a water-soluble organic material, which comprises a distillation column for distilling aqueous solutions of water-soluble organic materials which form azeotropes with water, for instance, alcohols such as ethanol, propanol, etc.

2. Prior Art

In the case of distilling an aqueous solution of 3 mol % of ethanol, for instance, distillation is conventionally carried out by using such a concentrating apparatus as shown in FIG. 7. In FIG. 7, a liquid containing ethanol (feed) is supplied to a central part of a distillation column 1. Part of the liquid in the distillation column 1 is sent from the column bottom 1$a$ to a reboiler 2, in which it is heated to generate a vapor, which is returned to the bottom part of the distillation column 1 and goes upward in the column. The vapor and the liquid reach equilibrium and are separated upward and downward at each stage of the distillation column 1. The vapor reaching the column top 1$b$ is cooled and condensed by a condenser 3, and refluxed to the column top 1$b$. As a result, the vapor and the liquid are circulated upward and downward in the distillation column 1 as shown by the arrows in FIG. 7. Concentrated ethanol is withdrawn from the column top 1$b$ to the outside, and the residue liquid with a reduced concentration of ethanol is withdrawn from the column bottom 1$a$ to the outside. Among paths connecting parts constituting the concentrating apparatus in the Figures described below, those shown by solid lines represent flow paths of liquid, and those shown by dotted lines represent flow paths of vapor. The arrows represent the directions of fluids flowing in the flow paths.

In the distillation column 1, for instance, concentration proceeds through the stages shown in FIG. 8. 1, 2, 3, . . . and 13, and 2', 3', . . . and 8' in the Figure represent the ethanol contents in a vapor phase and a liquid phase in the stages (theoretical stages) of the distillation column 1. 1, 2, 3, . . . represent the composition at each stage in the concentrating section, and 2', 3', . . . represent the composition at each stage in the recovery section.

The feed and the liquid flowing downward from the stage just above are in contact with the vapor coming upward from the stage just below in the feeding section (feed stage), resulting in the compositions of the vapor phase and the liquid phase as shown in 1 in the Figure. The relation in a vapor-liquid composition between a certain stage and its above and below stages is determined by the amounts of the circulating vapor and liquid, and the amounts of the liquid and the vapor withdrawn from the column bottom 1$a$ and the column top 1$b$ to the outside, which is shown as the operating line in the Figure.

In the concentrating section (upper stages other than the supply stage), the concentration of ethanol changes from the vapor-liquid composition 1 at the supply stage to the vapor-liquid composition 13 at the column top 1$b$ stepwise between the operating line and the vapor-liquid equilibrium curve. In the recovery section (lower stages than the supply stage), on the other hand, the concentration of ethanol decreases to the vapor-liquid composition 8' at the column bottom 1 a stepwise between the operating line and the equilibrium curve.

The operating line shown in FIG. 8 represents a case where, with respect to 1 kg·mol of ethanol, 6.7 kg·mol of a vapor is generated in the reboiler 2, and 5.5 kg·mol of a vapor is refluxed by the condenser 3, so that 99% of ethanol is recovered from the feed, thereby obtaining ethanol in a concentration of 84 mol % from the column top 1$b$. At this time, the energy necessary for concentration is 6000 kJ per 1 kg of ethanol. Though the number of stages necessary for the concentrating section in the distillation column 1 is theoretically 13 in the example shown in FIG. 8, the distillation column is actually provided with as many stages as about 3 times that number, taking stage efficiency into account.

Though decrease in vaporizing and refluxing leads to the reduction of energy consumption in the distillation column 1, as shown in FIG. 9, reduction of vaporizing and refluxing result in the operating line with a small gradient in the recovering section and a large gradient in the concentrating section.

In the case of the concentrating operation shown in FIG. 8, the operating line becomes close to the vapor-liquid equilibrium line as the vapor-liquid composition nears the azeotropic point of water and ethanol at the column top, necessitating many stages. Accordingly, when one tries to reduce energy consumption while maintaining the vapor-liquid composition at the column top, the operating line becomes closer to the vapor-liquid equilibrium line, resulting in an increase in the stages to a practically impossible number.

DISCLOSURE OF THE INVENTION

To improve the operation in a section above the concentrating section of the distillation column, the present invention provides, for instance, the following apparatus to reduce energy consumption in the process of distillation.

The apparatus for concentrating an aqueous solution of a water-soluble organic material which forms an azeotrope with water according to the first embodiment of the present invention comprises: (a) a distillation column for distilling an aqueous solution of a water-soluble organic material which forms an azeotrope with water; (b) a separator connected to the top of the distillation column to be fed with the vapor from the column top and comprising a separation membrane for separating the vapor or the liquid concentrated from this vapor into water and the water-soluble organic material; and (c) a means for recycling a condensed liquid of a condensed vapor of the water-soluble organic material obtained by the separator to the distillation column, the water-soluble organic material in the condensed vapor being concentrated more than in a column top vapor in the distillation column.

The apparatus for concentrating an aqueous solution of a water-soluble organic material which forms an azeotrope with water according to another example of the first embodiment of the present invention comprises: (a) a distillation column for distilling the aqueous solution of the water-soluble organic material; (b) a separator connected to the top of the distillation column to be fed with the vapor from the column top and comprising a separation membrane for separating the vapor into water and the water-soluble organic material; (c) a condenser disposed at downstream side of the separator for receiving the vapor in which the fraction of the water-soluble organic material is larger than that in the vapor from the column top; and (d) a means for refluxing the condensed liquid flown out of the condenser to the distillation column.

The apparatus for concentrating an aqueous solution of a water-soluble organic material which forms an azeotrope with water according to the second embodiment of the present invention comprises: (a) a first distillation column for preliminarily concentrating the aqueous solution of a water-soluble organic material; (b) a second distillation column fed with the liquid preliminarily concentrated in the first distillation column; (c) a separator connected to the top of the second distillation column to be fed with the vapor from the column top and comprising separation membrane for separating the vapor into water and the water-soluble organic material; (d) a means for recycling the condensed liquid of condensed vapor, in which the fraction of the water-soluble organic material is larger than that in the vapor from the top of the distillation column, of the water-soluble organic material received from the separator to the second distillation column; and (e) a means for utilizing the condensation heat of the vapor discharged from the top of the first or the second distillation column as a heat source for vaporizing liquid in the bottom of the other distillation column.

The apparatus for concentrating an aqueous solution of a water-soluble organic material which forms an azeotrope with water according to another example of the second embodiment of the present invention comprises: (a) a first distillation column for preliminarily concentrating the aqueous solution of a water-soluble organic material; (b) a second distillation column fed with the liquid preliminarily concentrated in the first distillation column; (c) a separator connected to the top of the second distillation column to be fed with the vapor from the column top and comprising a separation membrane for separating the vapor into water and the water-soluble organic material; (d) a condenser disposed at the downstream side of the separator for receiving the vapor in which the fraction of the water-soluble organic material is larger than that in the vapor from the top of the second distillation column; (e) a means for refluxing the condensed liquid which flows out of the condenser to the second distillation column; and (f) a means for utilizing the condensation heat of the vapor discharged from the top of the first or the second distillation column as a heat source for vaporizing liquid in the bottom of the other distillation column.

Because the operation temperature of the distillation column in the above apparatus for concentrating a water-soluble organic material is usually 80° C. or higher, for instance, adsorbents usable at high temperatures may be used in the means other than the distillation column. It is preferable, however, to use a zeolite membrane having high heat resistance to separate the water-soluble organic material from water.

THE BEST MODE FOR CARRYING OUT THE INVENTION

Figure 1:
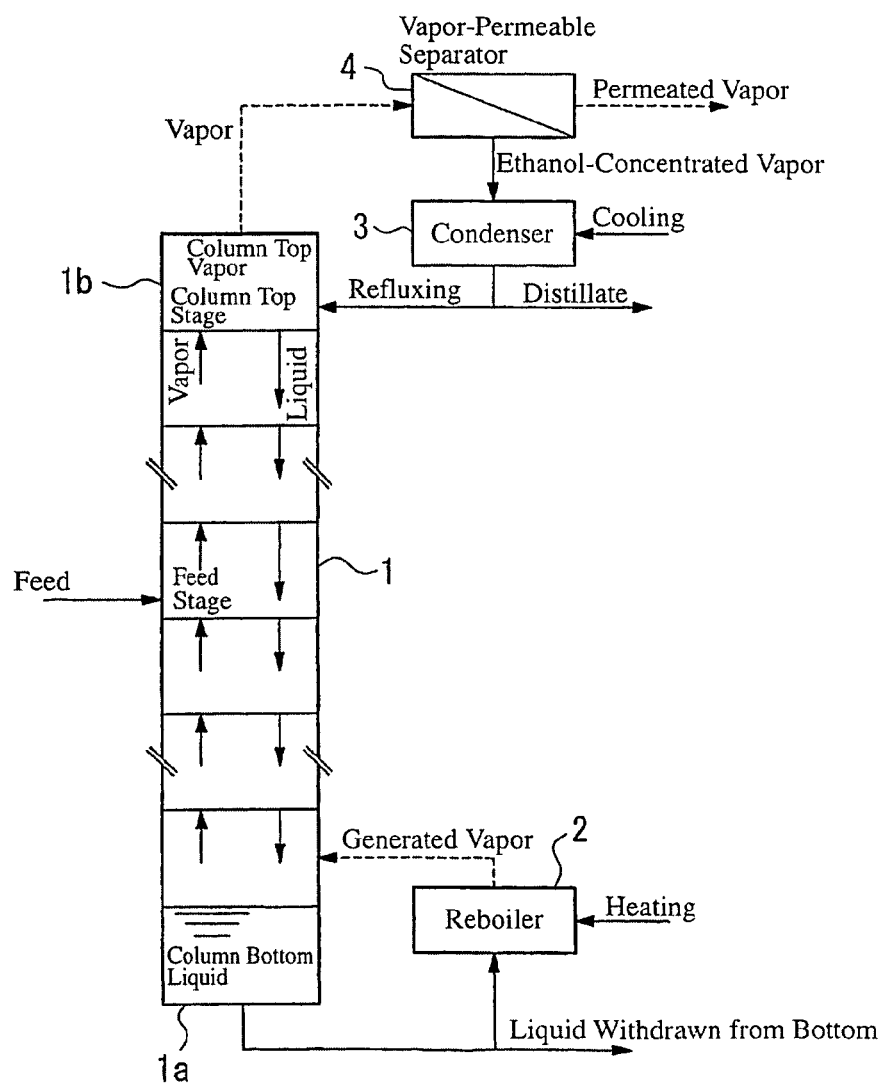
FIG. 1 is a view schematically showing the structure of an apparatus for concentrating a water-soluble organic material according to the present invention.
Figure 2:
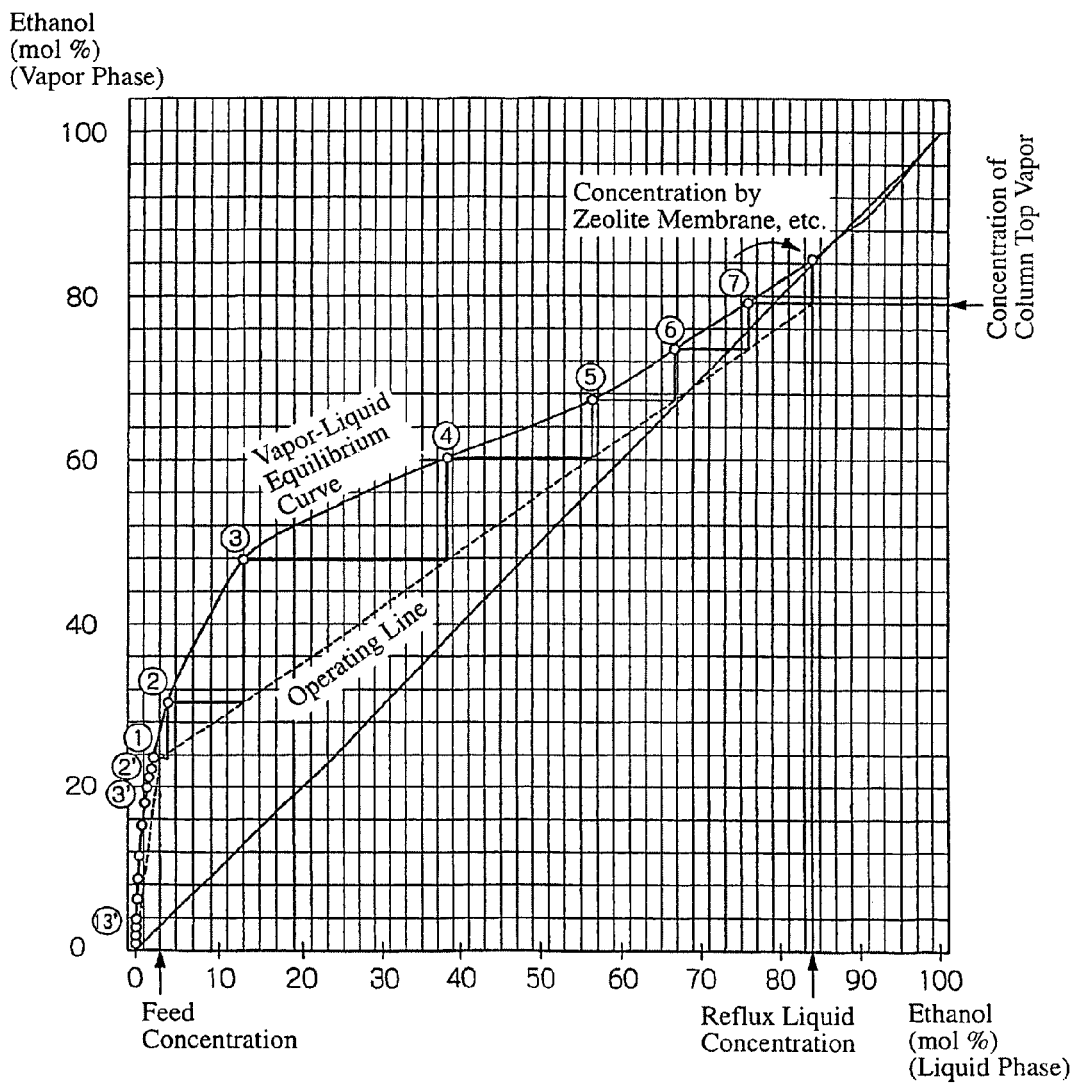
FIG. 2 is a view showing the process of concentrating ethanol in the distillation column shown in FIG. 1.
Figure 7:
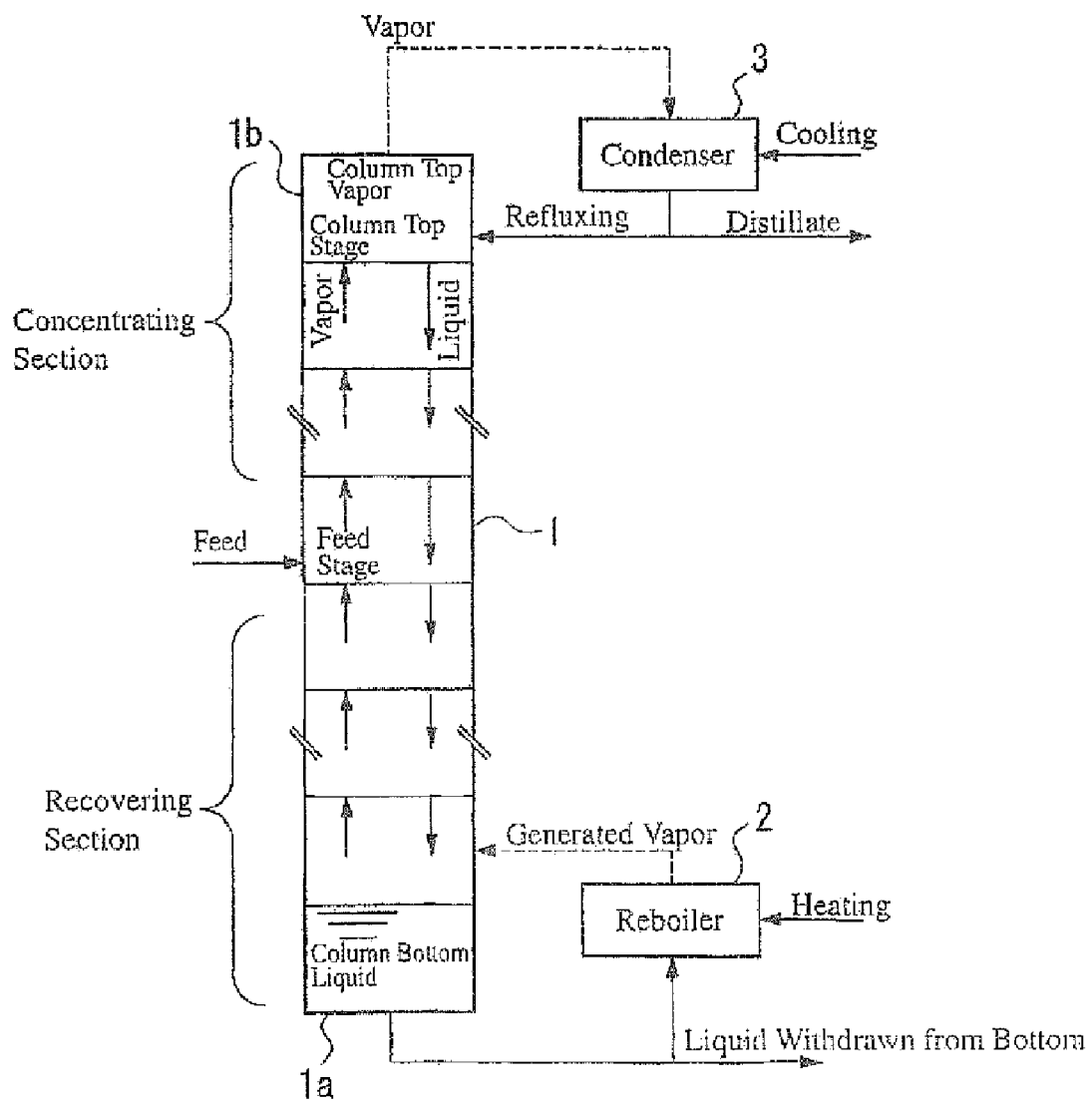
FIG. 7 is a view schematically showing the structure of a conventional alcohol-concentrating apparatus.

FIG. 1 shows an example of the structure of an apparatus for concentrating a water-soluble organic material according to the present invention, and FIG. 2 shows the process of concentrating ethanol in the distillation column shown in FIG. 1. In the following views, the same parts as in the conventional distillation column shown in FIG. 7 are assigned with the same reference numerals as in FIG. 7, and their explanation will be omitted.

In this apparatus for concentrating a water-soluble organic material, a vapor-permeable separator (other means than the distillation column) 4 comprising a zeolite membrane for separating a water-soluble organic material (ethanol in this embodiment) from water is disposed in a vapor flow path from the column top 1b of the distillation column 1 to the condenser 3. This vapor-permeable separator 4 can separate ethanol and water over their azeotropic point.

Withdrawn from the top 1b of the distillation column 1 is a less condensed vapor, namely a vapor containing a slightly lower concentration of ethanol than from a conventional distillation column (see 7 in FIG. 2). This vapor is introduced into the vapor-permeable separator 4, in which water vapor is separated to concentrate ethanol. This vapor with an increased ethanol concentration is condensed in the condenser 3, and refluxed to the distillation column 1.

Though the conventional distillation column fails to increase the percentage of an alcohol in the reflux to a higher extent than the column top vapor, it is possible, as shown in FIG. 2, to concentrate ethanol in a state where the operating line has a small gradient in the concentrating section, namely with small energy consumption, by increasing the percentage of ethanol in the reflux to greater than that in the column top vapor.

Figure 8:
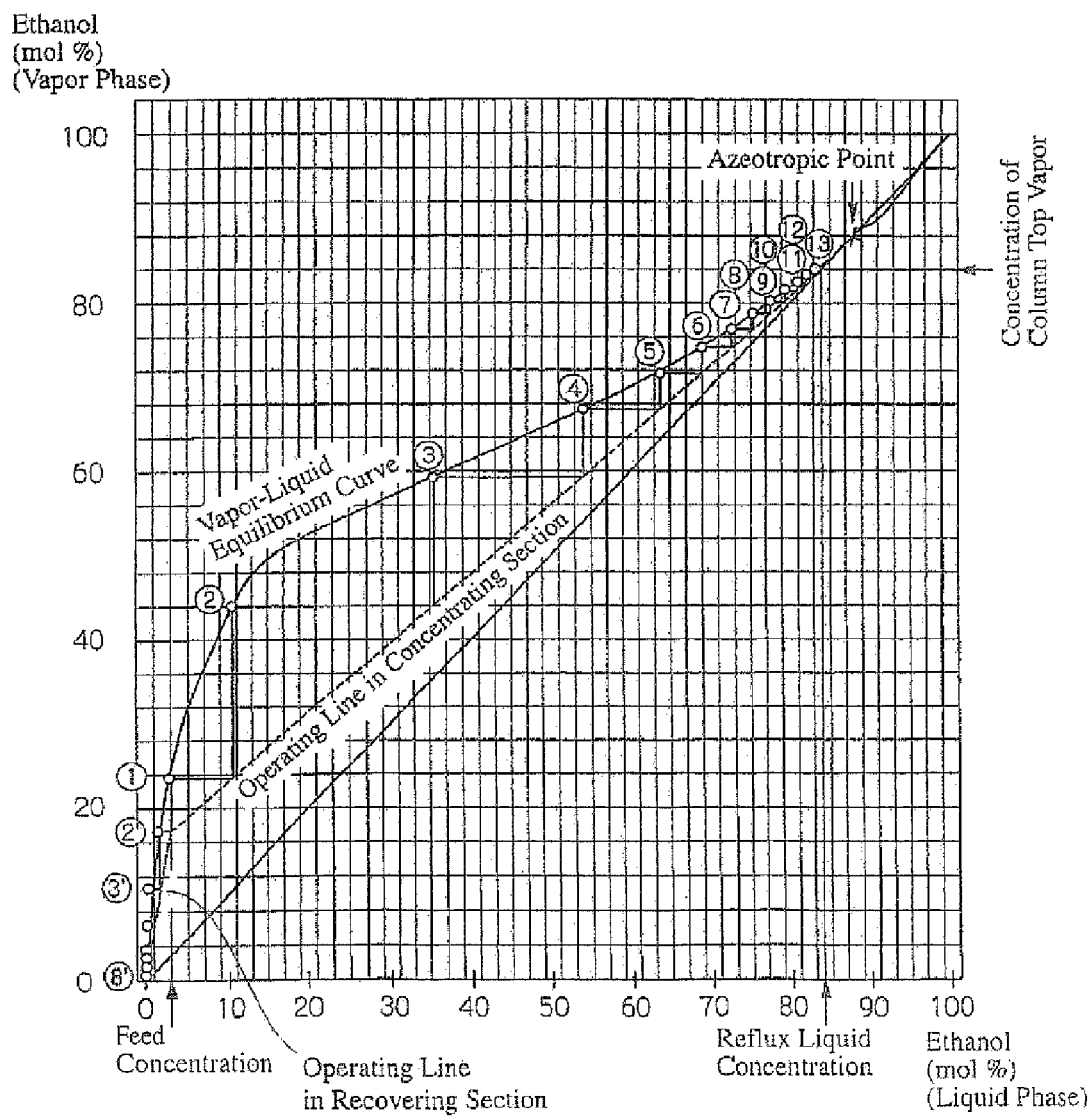
FIG. 8 is a view showing the process of concentrating ethanol in the distillation column shown in FIG. 7.
Figure 9:
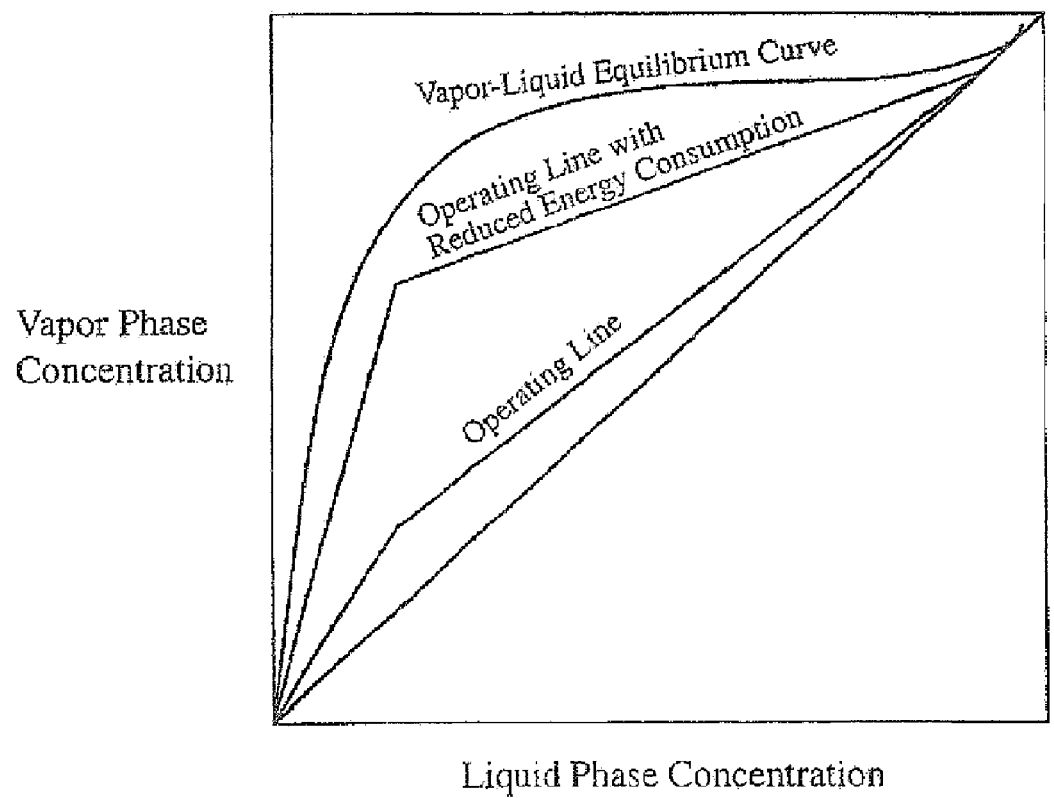
FIG. 9 is a view showing the relation between energy consumption and the process of concentrating ethanol in the distillation column.

The operation shown in FIG. 2 is achieved at an ethanol-recovering ratio of 99% and at an ethanol concentration of 84 mol % as in the case shown in FIG. 8. In this case, a vapor having an ethanol concentration of 80 mol % is concentrated to 84 mol % in the vapor-permeable separator 4. As a result, 4.9 kg·mol of vaporization product and 3.4 kg·mol of reflux product are needed per 1 kg·mol of ethanol. The amount of energy necessary for the concentration is 4400 kJ per 1 kg of ethanol, making it possible to concentrate ethanol using an amount of energy which is only 73% of the amount required using the conventional apparatus shown in FIG. 7.

Thus, the present invention can drastically reduce the amount of thermal energy necessary for the concentration of ethanol. As is clear from a comparison of FIGS. 2 and 8, the necessary number of stages in the concentrating section of the distillation column 1 can be reduced so as to be less than that needed in the conventional distillation column, by concentrating ethanol near the azeotropic point of water and ethanol in the vapor-permeable separator 4.

It is clear from FIG. 2 that the ethanol concentration in the feed should be increased to further reduce energy consumption. An example of an apparatus for concentrating a water-soluble organic material, which has been contemplated to further reduce energy consumption, is shown in FIG. 3.

Figure 3:
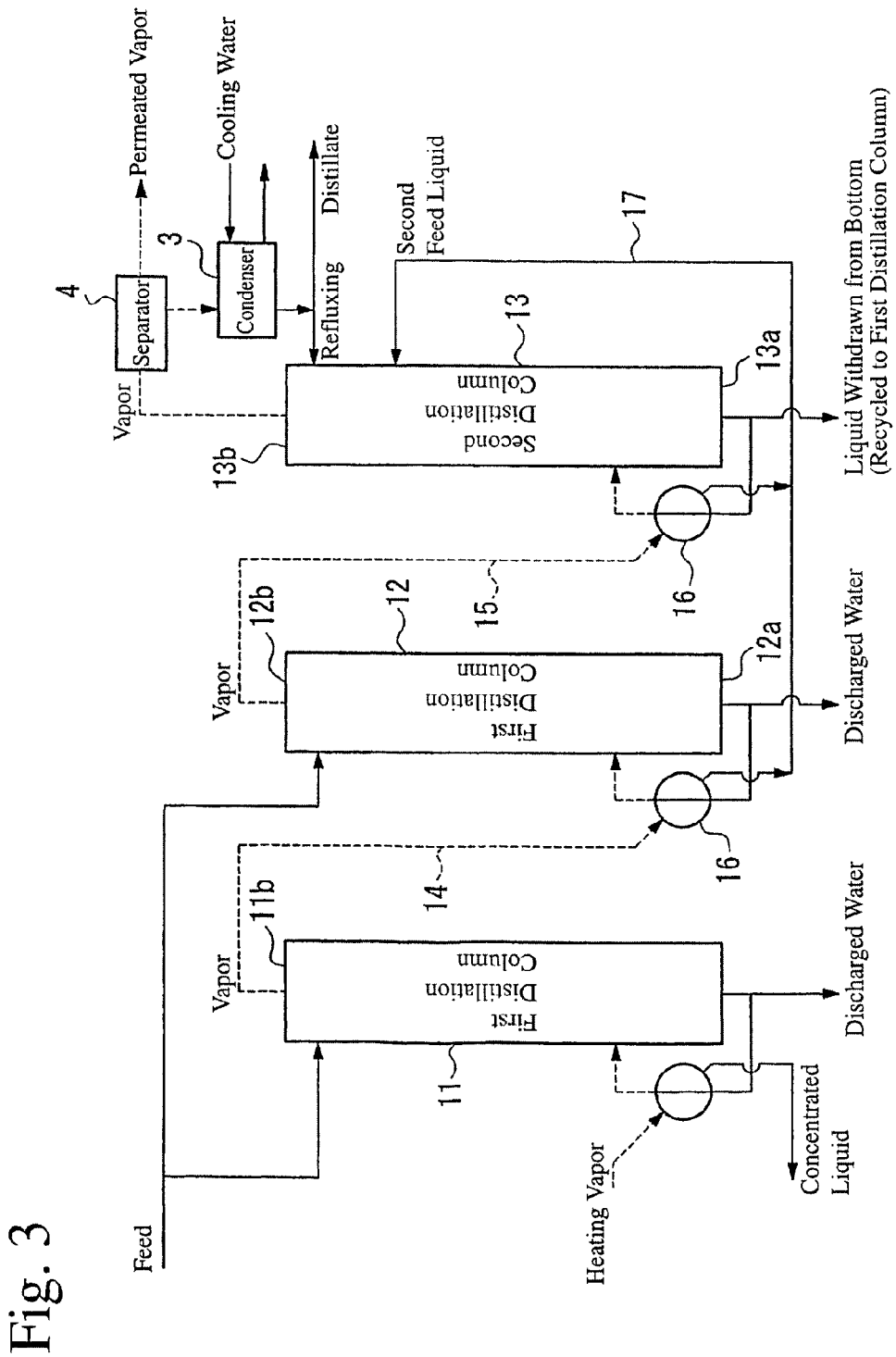
FIG. 3 is a view schematically showing the structure of an apparatus for concentrating a water-soluble organic material according to the second embodiment of the present invention.
Figure 4:
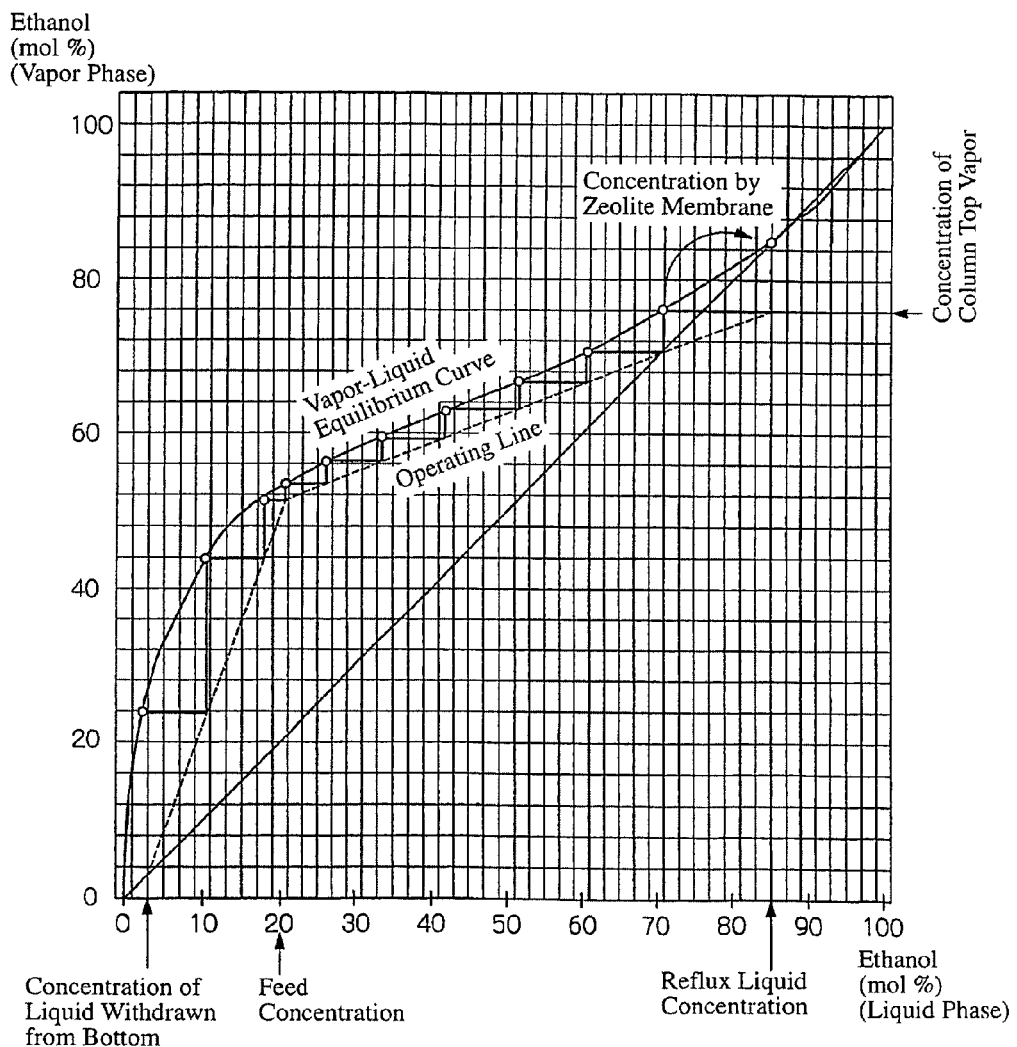
FIG. 4 is a view showing the process of concentrating ethanol in the second distillation column shown in FIG. 3.

In the apparatus shown in FIG. 3 for concentrating a water-soluble organic material, two first distillation columns 11, 12 are connected in series to a second distillation column 13 provided with a vapor-permeable separator 4, which comprises a zeolite membrane, in the vapor flow path from the column top 13b to condenser 3, as in the distillation column 1 shown in FIG. 1. The vapor discharged from the tops 11b, 12b of the first-stage distillation columns 11, 12 is supplied to reboiler 16 connected to the bottoms 12a, 13a of the second-stage distillation columns 12, 13 via flow paths 14, 15, so that the vapor is utilized for the heating of the column bottoms 12a, 13a, and the vapor is cooled and condensed. The resultant liquids are merged in a flow path 17, and supplied to the second distillation column 13 as a feed. The process of concentrating ethanol in the second distillation column 13 is shown in FIG. 4.

In this example of concentrating ethanol, the low-concentration ethanol solution is preliminarily concentrated to an ethanol concentration of 20 mol % by the first distillation columns 11, 12. The ethanol solution is distilled in the second distillation column 13 according to the same operation as in the above distillation column 1 shown in FIG. 1.

In this case, the second distillation column 13 needs less thermal energy, while the first distillation columns 11, 12 need more thermal energy for distillation. However, by using the vapor discharged from the first-stage distillation columns 11, 12 for the heating of the reboilers 16, 16 connected to the second-stage distillation columns 12, 13, respectively, as shown in FIG. 3, the amount of heat that must be supplied from outside can be reduced to a level which is only that substantially necessary for the heating of the reboiler 16 connected to the second distillation column 13.

Thus, energy consumption in this apparatus for concentrating a water-soluble organic material is reduced not only in the second distillation column 13, but also in the second-stage distillation columns 12, 13, in which the feed is heated and vaporized by the condensation heat of the vapor discharged from the first-stage distillation columns 11, 12, resulting in drastically reduced energy consumption for the concentration of ethanol. For instance, when a 3 mol % ethanol solution is concentrated to 85 mol %, the total amount of heat necessary for the first- and second-stage distillation is 3000 kJ per 1 kg of ethanol, 50% of the energy necessary for the conventional apparatus shown in FIG. 7.

The present invention is not restricted to the above embodiments but includes all applications and modifications unless they deviate from the spirit of the present invention. For instance, as the means other than the distillation column one can use not only the above-described vapor-permeable separator 4 comprising a zeolite membrane for separating an alcohol from water, but also membrane separators comprising other separation (separating) membranes, adsorption means for separating alcohols from water by the difference in adsorbability to water and alcohols, etc.

Also, the vapor discharged from the top of the distillation column may be once condensed, so that water is separated from the condensed liquid by a pervaporation separator comprising a zeolite membrane or other membranes, with the separated liquid being recycled to the distillation column.

In the second embodiment of the present invention, heating by heat supplied from outside is not necessarily restricted to the first distillation column 11 among those disposed in series. Namely, one or both of the distillation columns 12, 13 may be heated by an external heat source, and the vapor discharged from these distillation columns 12, 13 may be used to heat the other distillation column (for instance, first distillation column 11).

Figure 5:
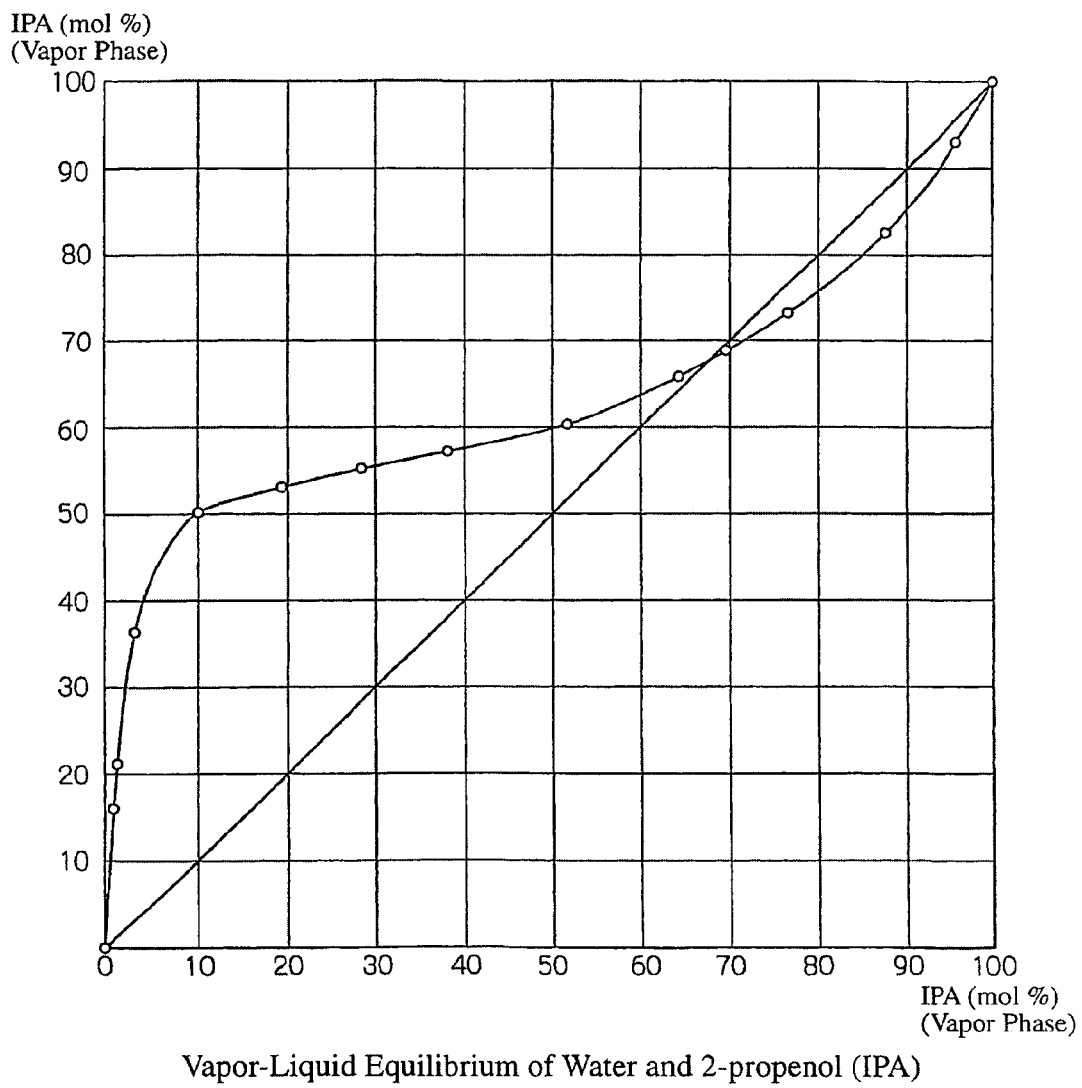
FIG. 5 is a view showing the vapor-liquid equilibrium of water and 2-propanol.

FIG. 5 is a view showing the vapor-liquid equilibrium of water and 2-propanol. In this case, too, there is an azeotropic point like in the case of water and ethanol. Accordingly, if propanol were concentrated by a conventional distillation method, there would be restrictions on operation with reduced energy consumption, because the operating line is close to the vapor-liquid equilibrium line near the azeotropic point. Thus, as in the case of the concentration of ethanol, it is possible to concentrate propanol with reduced energy consumption, by recycling the vapor discharged from the top of the distillation column to the distillation column after concentrating by a membrane separator such as the vapor-permeable separator 4 or an adsorption means, etc.

The zeolite membrane has a function of separating water not only from alcohols but also from other water-soluble organic materials. Accordingly, the present invention is applicable to the concentration of esters, amines, aldehydes, organic acids, etc., which form azeotropes with water.

Though the reflux liquid has a concentration equal to or lower than the azeotropic point of water and ethanol in the embodiments shown in FIGS. 1 and 3, ethanol in the vapor may be concentrated to a level exceeding the azeotropic point by using the vapor-permeable separator 4 comprising a zeolite membrane. Accordingly, the optimum reflux concentration of the second distillation column 13 may be determined in a wide range including a concentration equal to or higher than the azeotropic point, depending on the concentration of ethanol supplied from the first distillation columns 11, 12 to the second distillation column 13, thereby further reducing energy consumption. This is a further effect obtained by the present invention.

EXAMPLE

Figure 6:
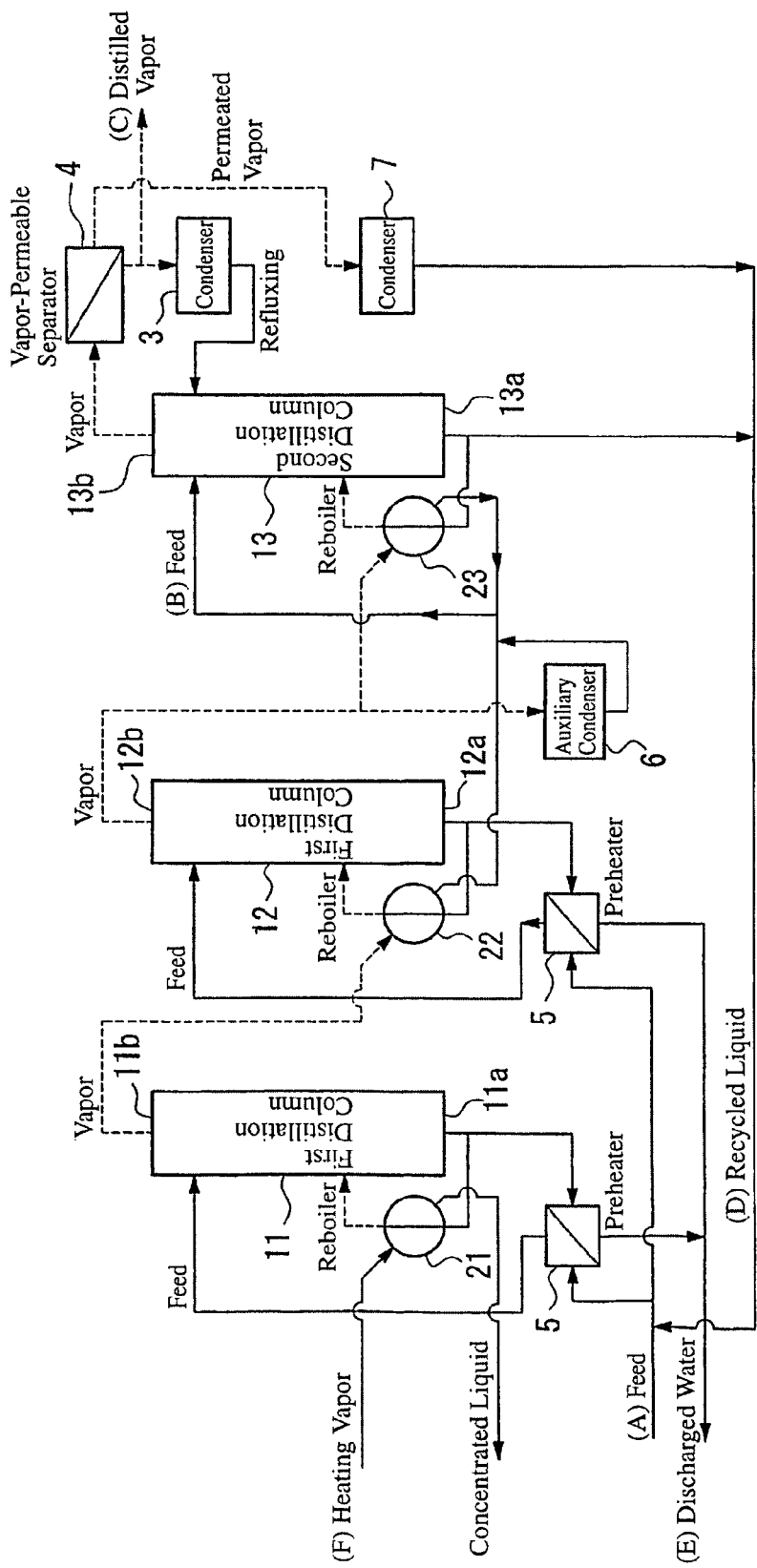
FIG. 6 is a view schematically showing the structure of an apparatus for concentrating a water-soluble organic material according to an embodiment of the present invention.

FIG. 6 shows an example, in which 1000 kg of a 3 mol % aqueous ethanol solution is supplied to obtain ethanol at a concentration of 85 mol % or more using the apparatus for concentrating a water-soluble organic material according to the present invention.

The feed is preheated to a predetermined temperature by preheaters 5, and then supplied to the first distillation columns 11, 12, respectively, where it was concentrated to 20 mol %. The first distillation columns 11 and 12 are operated at 520 kPa and 220 kPa, respectively. The reboiler 21 connected to the first distillation column 11 is heated by steam at 700 kPa charged from the outside, and the reboiler 22 connected to the first distillation column 12 is heated by the condensation heat of the vapor discharged from the top 11b of the first distillation column 11. The vapor discharged from the top of the first distillation column 12 is used for the heating of the reboiler 23 connected to the second distillation column 13 operated at atmospheric pressure. Because there is some excess heat, part of the vapor is cooled and condensed by an auxiliary condenser 6. In the case of obtaining a 20 mol % solution from a 3 mol % solution, refluxing is unnecessary in the first distillation columns 11, 12.

A 20 mol % aqueous ethanol solution supplied from the first distillation columns 11, 12 is supplied to the second distillation column 13, and a vapor containing ethanol in a concentration of 80 mol % is withdrawn from the top 13b of the second distillation column 13. This vapor is passed through the vapor-permeable separator 4 comprising a zeolite A membrane available from Mitsui Engineering & Shipbuilding Co., Ltd. to concentrate ethanol to a concentration of 85 mol %. Part of the vapor, in which ethanol is concentrated, is withdrawn outside the system as a product, while the other part of the vapor is condensed by the condenser 3 and then recycled to the second distillation column 13.

A liquid containing ethanol in a concentration of 3 mol % is withdrawn from the bottom 13a of the second distillation column 13 and recycled to the first distillation columns 11, 12 on the supply side. Because water vapor passing through the zeolite membrane of the vapor-permeable separator 4 contains a small percentage of ethanol, it is cooled and condensed by the condenser 7, and then recycled to the first distillation columns 11, 12 on the supply side.

Table 1 shows the flow rates and ethanol concentrations of the liquid in main parts of the apparatus shown in FIG. 6 for concentrating a water-soluble organic material.

| Parts | A Feed | B Feed | C Distilled Vapor | D Recycled Liquid | E Discharged Water | F Heating Vapor |
|---|---|---|---|---|---|---|
| Flow Rate (kg/h) | 1000.0 | 218.5 | 78.4 | 140.1 | 921.6 | 110 |
| Concentration of Ethanol mol % | 3.0 | 20.0 | 85.0 | 3.0 | 100 ppm by weight | — |

In this Example, a final product is 99.5% anhydrous alcohol. Accordingly, part of the vapor passing through the vapor-permeable separator 4, which contains ethanol in a concentration of 85 mol %, is withdrawn outside the system, and the remaining vapor is condensed and recycled to the second distillation column 13. The vapor distillate is further concentrated by the zeolite membrane to obtain anhydrous alcohol. However, in the case of obtaining 85 mol % (95.7% by volume) of ethanol as a product, the entire vapor may be condensed to withdraw part of the condensed liquid as a product, while recycling the remainder to the distillation column.

What is claimed is:

1. An apparatus for concentrating an aqueous solution of a water-soluble organic material which forms an azeotrope with water comprising: (a) a first distillation column for preliminarily concentrating said aqueous solution of a water-soluble organic material; (b) a second distillation column fed with the liquid preliminarily concentrated in said first distillation column; (c) a separator connected to the top of said second distillation column to receive a vapor from the top of the second distillation column and comprising a separation membrane for separating said vapor into water and said water-soluble organic material; (d) a condenser disposed at a downstream side of said separator for receiving the vapor in which a fraction of said water-soluble organic material is larger than that in said vapor from the top of the second distillation column; (e) means connected to said condenser for withdrawing part of the condensed liquid from said condenser as a product; (f) means for recycling the rest of said condensed liquid to the top of said second distillation column for refluxing; and (g) means for utilizing the condensation heat of said vapor discharged from the top of said first distillation column as a heat source for vaporizing liquid in the bottom of said second distillation column, further comprising (h) means for recycling the liquid from the bottom of the second distillation column to the first distillation column, and (i) means for condensing the vapor passing through a zeolite membrane and recycling said condensed vapor to the first distillation column.

2. An apparatus for concentrating an aqueous solution of a water-soluble organic material which forms an azeotrope with water comprising: (a) a first distillation column for preliminarily concentrating said aqueous solution of a water-soluble organic material; (b) a second distillation column fed with the liquid preliminarily concentrated in said first distillation column; (c) a separator connected to the top of said second distillation column to receive a vapor from the top of the second distillation column and comprising a separation membrane for separating said vapor into water and said water-soluble organic material; (d) means for withdrawing as a product part of a vapor from said separator, in which a fraction of said water-soluble organic material is larger than that in the vapor from the top of said second distillation column; (e) a condenser disposed at a downstream side of said separator for receiving the rest of said vapor; (f) means for recycling condensed liquid to the top of said second distillation column for refluxing; and (g) means for utilizing condensation heat of the vapor discharged from the top of said first distillation column as a heat source for vaporizing liquid in the bottom of said second distillation column, further comprising (h) means for recycling the liquid from the bottom of the second distillation column to the first distillation column, and (i) means for condensing the vapor passing through a zeolite membrane and recycling said condensed vapor to the first distillation column.

\* \* \* \* \*